United States Patent [19]
Leonhart

[11] Patent Number: 5,481,333
[45] Date of Patent: Jan. 2, 1996

[54] LATCHABLE VACUUM BLANKET FRAME ASSEMBLY

[75] Inventor: Charles J. Leonhart, Schaumburg, Ill.

[73] Assignee: nuArc Company, Inc., Niles, Ill.

[21] Appl. No.: 231,621

[22] Filed: Apr. 22, 1994

[51] Int. Cl.⁶ .................................................. G03B 27/20
[52] U.S. Cl. .................. 355/91; 355/73; 355/76
[58] Field of Search .............................. 355/73, 76, 91, 355/92, 93, 94

[56] References Cited

U.S. PATENT DOCUMENTS

| | | |
|---|---|---|
| 1,151,477 | 8/1915 | Knudsen . |
| 1,702,232 | 2/1929 | Koppe . |
| 3,119,318 | 1/1964 | Forester et al. . |
| 3,147,683 | 9/1964 | Hulen . |
| 3,266,402 | 8/1966 | Benson . |
| 3,399,584 | 9/1968 | Lewicki . |
| 3,463,587 | 8/1969 | Oltra et al. . |
| 3,507,593 | 4/1970 | McTeague . |
| 3,627,416 | 12/1971 | Benson . |
| 3,738,742 | 6/1973 | Fukushima . |
| 4,028,166 | 6/1977 | Leonhart . |
| 4,423,851 | 1/1984 | Heitmann . |
| 4,484,813 | 11/1984 | Maher et al. . |
| 4,536,085 | 8/1985 | Hliboki et al. . |
| 4,551,016 | 11/1985 | Maher et al. . |
| 4,575,233 | 3/1986 | Copeland et al. . |
| 4,619,526 | 10/1986 | Hougaard . |
| 4,664,511 | 5/1987 | Carlson et al. . |
| 4,669,870 | 6/1987 | Fosh . |
| 4,704,028 | 11/1987 | Richards, Sr. . |
| 4,754,309 | 6/1988 | Lesko ........................................ 355/91 |
| 4,935,773 | 6/1990 | Meacham . |
| 4,967,230 | 10/1990 | Meacham . |
| 4,984,017 | 1/1991 | Nishida et al. .......................... 355/91 |
| 4,989,035 | 1/1991 | Leonhart . |
| 4,996,560 | 2/1991 | Nanri et al. .............................. 355/91 |
| 5,051,777 | 9/1991 | Leonhart ................................. 355/93 |
| 5,072,257 | 12/1991 | Stoesser et al. ......................... 355/93 |
| 5,121,161 | 6/1992 | Dondich .................................. 355/94 |
| 5,298,940 | 3/1994 | Ohlig ...................................... 355/91 |

Primary Examiner—Michael L. Gellner
Assistant Examiner—D. P. Malley
Attorney, Agent, or Firm—Mason, Kolehmainen, Rathburn & Wyss

[57] ABSTRACT

A vacuum frame apparatus including a latching system with means to assist in repressurizing the vacuumized area of the frame includes a vacuum blanket support frame pivotally mounted along one side of a glass panel for holding workpieces in precise registration against the glass panel for making copies includes a hollow rectangular frame around a flexible vacuum blanket. The frame members have a plurality of small vacuum ports on the underside inside a peripheral bead seal for evacuating the space between the flexible vacuum blanket and the glass panel when a vacuum is pulled on the interior of the hollow peripheral frame by a vacuum pump. Large size frontal ports are provided on the front side member of the frame to cooperate with batch mechanisms for clamping and holding the frame tightly against the glass panel during copy making. The latch members serve a dual function of latching and holding the frame in a closed position for exposure of material and automatically closing and opening the frontal ports, respectively, when the latch mechanisms are operated to speed up breaking of the vacuum and opening of the frame at the end of a copy making cycle in readiness for the next operation.

20 Claims, 2 Drawing Sheets

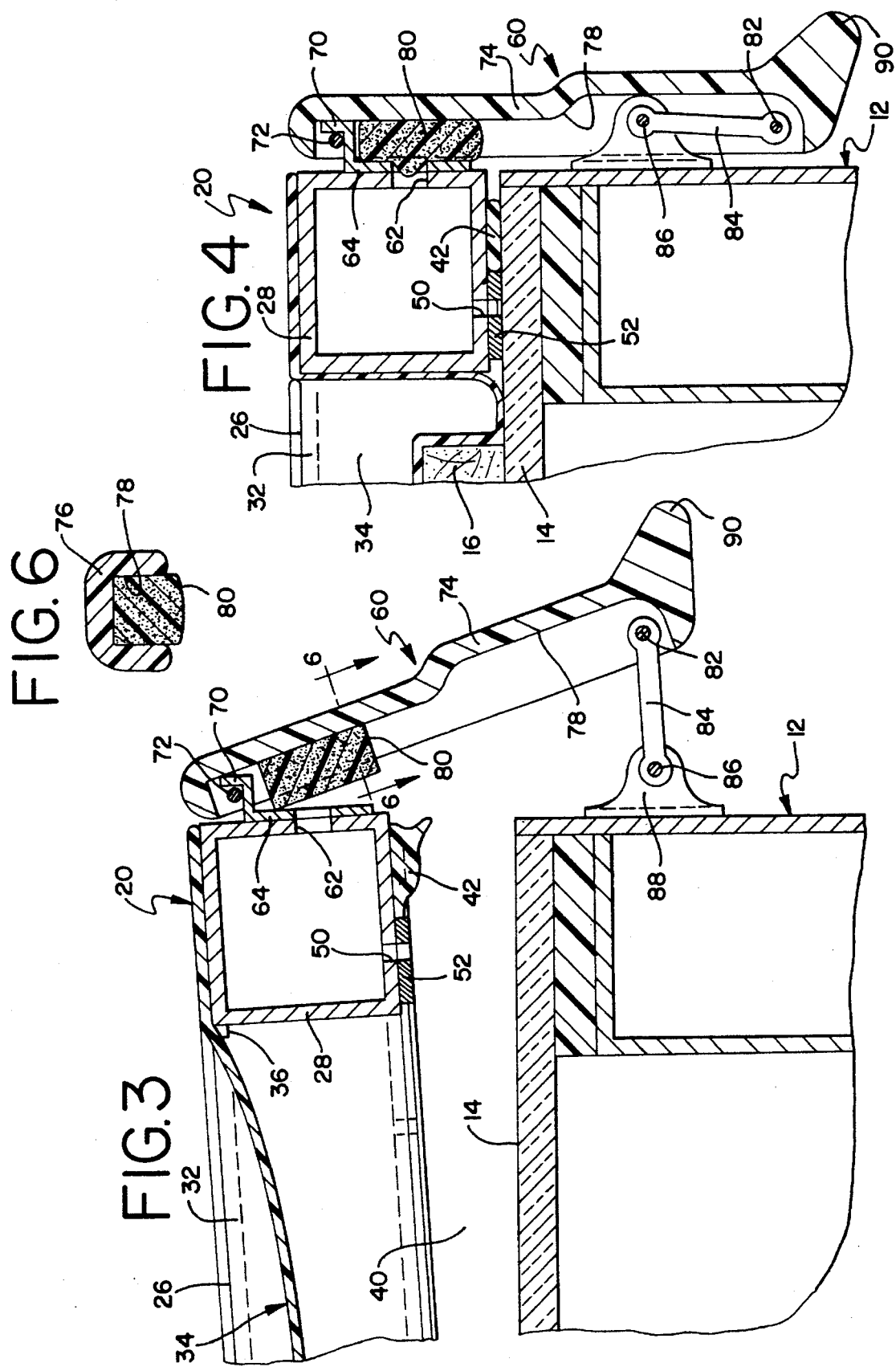

LATCHABLE VACUUM BLANKET FRAME ASSEMBLY

BACKGROUND OF THE INVENTION

1. Field of the Invention

The present invention relates to a new and improved latchable vacuum blanket frame assembly including a base supporting a glass panel and a vacuum blanket frame hingedly mounted along one side of the glass panel for movement between a closed position and an open, angularly divergent position elevated from a working face of the glass panel for loading and removing sheets of film media used for making copy sheets, with silk screen materials, photographic plates and the like.

More particularly, the latchable vacuum blanket frame system of the present invention is especially adapted to provide a latching mechanism that contributes to the operation of the vacuum blanket frame assembly when latching and unlatching the vacuum blanket frame and the glass panel.

2. Background of the Prior Art

Vacuum blanket frame assemblies have been used for obtaining precise registration between a film media master image sheet and a pre-sensitized image sheet while the sheets are sandwiched together between a flexible vacuum blanket and a glass panel for controlled light exposure. A primary function of a vacuum blanket frame assembly is to assure intimate contact between the materials during exposure in order to maintain image transfer integrity. Vacuum blanket frames are sometimes pivotally mounted on a support base structure and generally include a peripheral frame structure which carries a flexible vacuum blanket operable to press together film media sheets in close precision registration against the planar surface of a glass panel.

U.S. Pat. No. 3,738,742 discloses a photographic printer having a rectangular printing frame or base that is rotatably mounted in a cabinet containing a light source for movement between alternate positions for exposure of film media held in precise registration against a planar surface of the printing frame.

U.S. Pat. No. 4,028,166 discloses a system for laminating sheet material employing a rigid base structure and a hingedly attached rectangular frame with vacuum means for insuring accurate registration between media sheets placed thereon.

U.S. Pat. No. 3,627,416 discloses a contact printing employing twin frame structures for making photographic plates utilizing silk screen materials and the like.

Other photographic contact printers for silk screen materials and the like are shown in U.S. Pat. Nos. 3,399,584 and 3,266,402.

U.S. Pat. No. 1,151,477 discloses an exposing table employing a flexible vacuum blanket and U.S. Pat. No. 3,463,587 discloses a vacuum frame for silk screen materials having adjustable clamps for varying the amount of compression on a peripheral air and light seal.

U.S. Pat. No. 1,702,232 discloses a vacuum pressure printing frame having a cover plate cooperating with a flange of a sealing strip forming an air-tight chamber around a negative and a press plate and U.S. Pat. No. 4,536,085 discloses a multiple vacuum frame unit including a glass frame pivotally mounted on a base and a blanket frame pivotally connected to the glass frame.

U.S. Pat. No. 4,664,511 discloses a registration board capable of dissipating static electricity through a conductive sink in a vacuum frame exposure system, and U.S. Pat. No. 3,147,683 discloses a photographic printing apparatus for "step and repeat" printing processes.

U.S. Pat. No. 4,575,233 discloses a photographic printer for exposing both sides of printed circuit boards and U.S. Pat. No. 4,989,035 discloses a latch and lifting system for a vacuum frame assembly employing a common lift member for operating a plurality of latches.

U.S. Pat. Nos. 3,119,318; 3,507,593; 4,423,851; 4,484,813; 4,551,016; 4,619,526; 4,669,870 and 4,704,028 relate to vacuum blankets and the like U.S. Pat. No. 4,967,230 discloses a registration system for light exposure apparatus employing a glass frame and a vacuum blanket and U.S. Pat. No. 4,935,773 discloses another type of vacuum blanket.

OBJECTS OF THE INVENTION

It is an object of the present invention to provide a new and improved latchable blanket frame assembly for photographic plate and copy makers used in the graphic arts industry.

More particularly, it is an object of the present invention to provide a new and improved latchable vacuum blanket frame assembly for securely latching a vacuum blanket support frame in operative position relative to a glass panel supported on a base structure.

Another object of the present invention is to provide a new and improved vacuum blanket frame latching system including a latch operable to rapidly control and release a vacuum drawn on a pivotally mounted vacuum blanket frame latchably engageable with a supporting base structure carrying a glass panel.

It is another object of the present invention to provide a new and improved latch for a vacuum blanket frame which is operable to control the flow of air into and out of the vacuum frame when latched and unlatched.

Yet another object of the invention is to provide a new and improved exposure unit well adapted for silk screen materials and having an improved seal breaking system.

Yet another object of the present invention is to provide a new and improved latchable vacuum blanket frame assembly which is capable of more rapid response in establishing and releasing a vacuum drawn on the assembly.

BRIEF SUMMARY OF THE PRESENT INVENTION

The foregoing and other objects and advantages of the present invention are accomplished in a new and improved latching vacuum blanket frame assembly in combination with a glass panel on a supporting base. The vacuum blanket frame is hingedly attached along one side of the base for movement between a closed position in parallel with the base and an angularly divergent, open position for inserting and removing film media sheets used for plate making, copy making and the like. A latch system in accordance with the invention includes one or more latches having cooperating elements mounted on the vacuum blanket frame and the base, respectively, on a side opposite that off hinged attachment between the base and frame. A vacuum pump is connected to the hollow interior of the vacuum blanket frame for withdrawing air from the space between the vacuum blanket on the frame and the glass panel on the support base.

Each frame member of the frame is formed with a plurality of vacuum ports spaced along the length and inside a sealing strip between the frame and glass panel. One of the frame members on which a latch element is mounted is provided with a frontal vacuum port which is opened and closed by means of the other cooperative latch element. When the latch is in a latched position for clamping the vacuum blanket frame and glass panel closely together, the frontal port is sealed off automatically by the cooperating latch element permitting a vacuum to be rapidly drawn on the hollow frame as air is withdrawn through the spaced apart vacuum ports on the frame member from the space between the vacuum blanket and glass panel.

When the cooperating latch element is subsequently opened to an unlatched position after a copy making operation has been completed, the frontal port is automatically opened to allow the hollow frame to rapidly fill with air for releasing the vacuum blanket. The frame can then be moved to the open position so that the completed work can be removed and new work put in place ready for the next operational cycle.

The flexible vacuum blanket, bead and latch keepers are mounted respectively on the top, bottom and front surfaces of the tubular frame. The tubular frame assembly including the vacuum blanket, bead and latch keepers is pivotally mounted to the base of the unit to allow positioning of the vacuum frame parallel to a glass platen causing a seal between the glass and the bead, thus creating a chamber to be vacuumized. Air evacuation holes or ports are provided in the bottom side of the tubular frame around the inside perimeter of the bead. The tubular frame is connected to a vacuum pump for air evacuation.

The tubular frame is provided with air inlet ports located to align with holes in the latch keepers. The latches are provided with a pressure pad positioned to seal off the air inlet ports when the vacuum frame is in the closed and latched position.

In use, graphic arts materials are placed on the glass platen, the vacuum frame is pivoted to contact the bead with the glass and the vacuum frame is latched to the base of the unit. The air in the chamber created between the vacuum frame and the glass is evacuated using a vacuum pump. After the exposure of the graphic arts material is completed, the pump is turned off and the latches are unlatched, removing the latch pressure pads from the air inlet ports of the tubular frame and allowing air to re-enter the vacuumized chamber, repressurizing the chamber and releasing the seal of the vacuum blanket from the glass and the graphic arts material.

BRIEF DESCRIPTION OF THE DRAWINGS

For a better understanding of the present invention, reference should be had to the following detailed description taken in conjunction with the drawings, in which:

FIG. 3 is a fragmentary cross-sectional view taken substantially along lines 3—3 of FIG. 1;

FIG. 4 is a fragmentary cross-sectional view similar to FIG. 3, but illustrating the vacuum blanket frame in a closed and latched position;

FIG. 6 is a fragmentary cross-sectional view taken substantially along lines 6—6 of FIG. 3.

DETAILED DESCRIPTION OF A PREFERRED EMBODIMENT OF THE INVENTION

Figure 1:
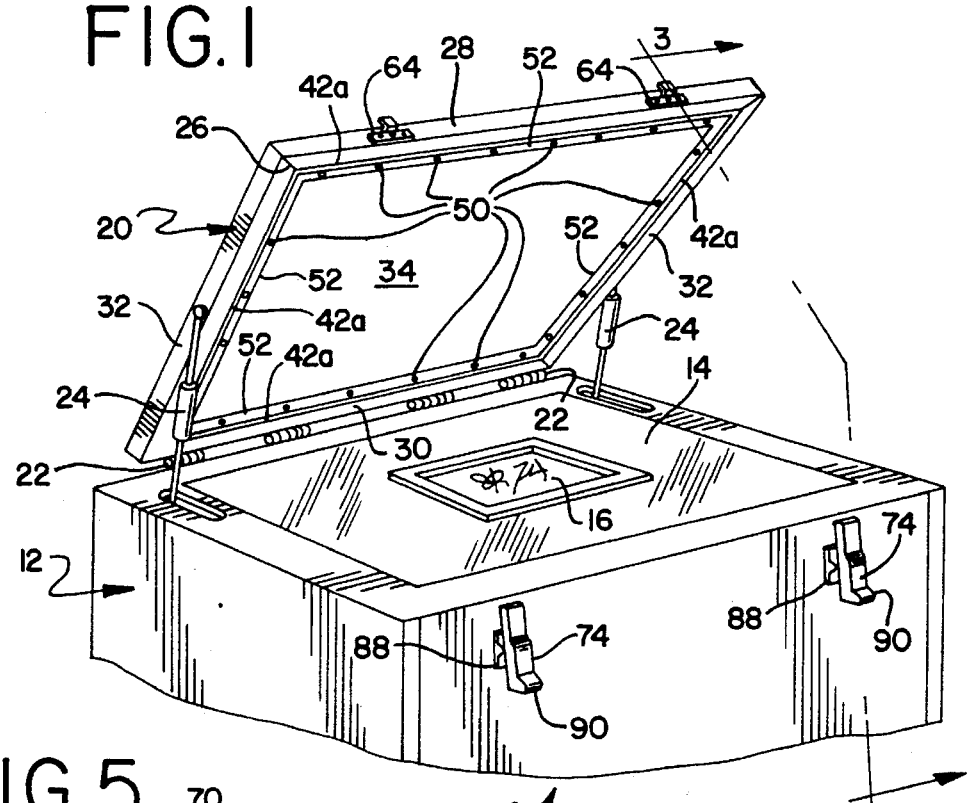
FIG. 1 is a frontal upper side perspective elevational view of an exposure unit employing a vacuum blanket frame assembly and latch system in accordance with the features of the present invention.

Referring now more particularly to the drawing, therein is illustrated a new and improved exposure unit 10 including an upstanding, generally rectangular-shaped base cabinet 12 for containing a controlled light source (not shown) and other control components for directing and controlling an upwardly aimed light beam for illuminating a large, horizontally disposed, rectangular-shaped, rigid, transparent plastic or glass panel 14. The glass panel 14 is supported by the base cabinet 12 at a convenient working level for supporting work sheets and/or a silk screen and frame 16 placed thereon for image transfer.

Figure 2:
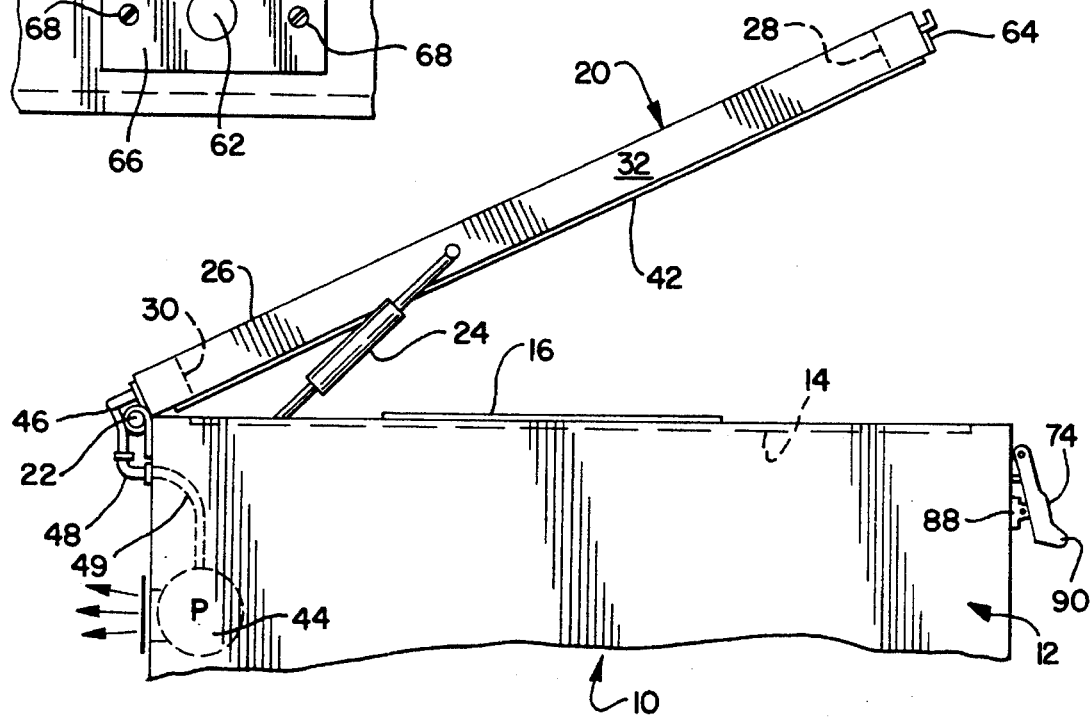
FIG. 2 is a side elevational view of the exposure unit.

A vacuum blanket frame assembly 20 in accordance with the present invention is pivotally mounted by hinges 22 along a rearward edge to pivot between a horizontal, closed, expose position (FIG. 4) and an upwardly sloping, fully open position FIGS. 1 and 2) for convenient loading and unloading of work sheets 16 on the glass panel 14. Air springs 24 are provided on opposite sides of the frame assembly 20 for positively retaining the frame assembly in the open position.

The vacuum blanket frame assembly 20 includes a large, rectangular-shaped, metal frame 26 having an elongated, hollow, tubular front side frame member 28, a similar, parallel rear side frame member 30 and a pair of similar opposite, transverse, side frame members 32 interconnecting opposite ends of the front and rear side frame members to form a relatively rigid, strong, lightweight, integral rectangular hollow frame structure. The frame members 28, 30 and 32 are sealed together at the corners and form an enclosed air-tight vacuum chamber except for specific ports provided in the walls of the frame members as more specifically described and set forth hereinafter.

The rectangular frame 26 supports a thin flexible vacuum blanket 34 and other types of flexible vacuum blankets can be utilized. A continuous peripheral outer edge portion of the blanket 34 is sealingly attached to the frame 26 to provide an air-tight seal 36 so that when a vacuum is drawn in a space 40 (FIG. 3) between the lower surface of the vacuum blanket 34 and an upper surface of the rigid glass panel 14, ambient outside air pressure forces the flexible blanket 34 in the frame 26 (FIG. 4) to press the work sheets and silk screen frame 16 together against the flat upper surface of the glass panel 14.

Referring now to FIGS. 1, 3 and 4, the underside of the frame 26 is provided with a continuing, peripheral resilient seal bead 42 having a compressible, large size outside portion which is flattened out (FIG. 4) to establish an air-tight chamber around the periphery of the frame between the frame and the glass panel 14 when the vacuum blanket frame assembly 20 is moved down to the horizontal, closed position as shown. After the vacuum blanket frame assembly 20 is in a closed position, air is withdrawn from the space 40 between the vacuum blanket 34 and glass panel 14 inside of the peripheral sealing bead 42 by means of a vacuum pump 44 (FIG. 2) connected to the interior of the frame 26 through a flexible hose and fitting 46 on the rear frame member 30. The hose 46 is connected to the vacuum side of the pump 44 via an elbow 48 and conduit 49 in the base cabinet 12 in which the pump is housed.

The hollow interior of the rectangular frame 26 is evacuated of air when the vacuum pump 44 is in operation and evacuating air from the space 40 inside or within the peripheral bead seal 42 passes into the hollow frame through a plurality of spaced apart first vacuum ports 50 provided in the lower walls of the frame members 28, 30 and 32. The first ports 50 in the frame members are aligned with ports formed with retaining strips 52 used for preventing inward movement of the seal bead 42 toward the center of the rectangular frame 26.

In accordance with the present invention, a plurality of latch mechanisms 60 (FIGS. 3 and 4) are provided for tightly clamping and latching the vacuum blanket frame assembly 20 in place on the glass panel 14 of the support base 12. The latch mechanisms 60 also serve another dual function in automatically opening and closing an associated second frontal vacuum port 62 formed in the front wall of the front side frame member 28 when the latch mechanisms are moved out of and into a closed or latched condition (FIG. 4) toward an open or partially unlatched condition (FIG. 3) toward a fully open or completely disconnected condition as shown in FIGS. 1 and 2.

Figure 5:
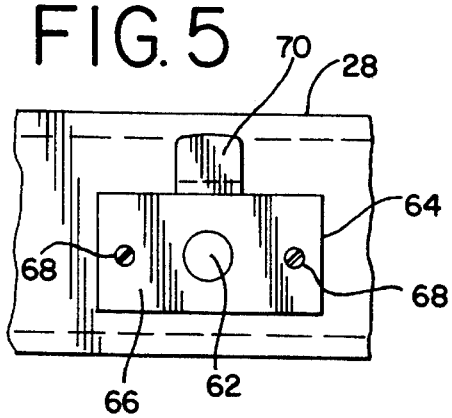
FIG. 5 is a fragmentary, front elevational view showing a latch element on the vacuum blanket frame and a frontal vacuum port.

Each latch mechanism 60 includes a first latch element comprising an upper hook plate 64 (FIG. 5) having a rectangular body 66 with a central aperture aligned with a frontal port 62. The body 66 is sealed against and attached to the front wall of the front side member 28 by means of fasteners 68 on either side of the frontal port 62. At the center of the upper edge of the body 66, each hook plate 64 is formed with a narrow outwardly and upwardly extended hook portion 70 adapted for retaining engagement with a latch pin 72 on the upper inside portion of a second latch element comprising an elongated, lower latch lever 74. Preferably, the lower latch lever 74 has a body 76 of channel-shaped transverse cross-section (FIG. 6) providing a recess 78 on the inside face of the lever for receiving and containing a resilient, compressible, port closure element 80 adapted to close-off and seal the frontal port 62 when the latch mechanism 60 is in the closed or fully latched condition as shown in FIG. 4.

Each latch lever 74 is pivotally supported at a lower end portion on a pin 82 at the outer end of an over-center toggle link 84. Each toggle link 84 is connected at an inner end to a pin 86 which in turn is carried on a clevis 88 secured to the front face of the base cabinet 12 by fasteners. At the lower end, the body 76 of each latch lever is provided with an outwardly and downwardly projecting operating tab 90 designed to facilitate latching and unlatching of the latch mechanisms 60.

The frontal ports 62 of the front side member 28 of the vacuum blanket frame 26 are much larger in size than the vacuum ports 60 spaced along the elongated frame members 28, 30 and 32. Accordingly, when the latch members 60 are unlatched from the position of FIG. 4, the large ports 62 provide for rapid breaking of the vacuum in the space 40, and thus the frame 26 can be opened more rapidly than if the only way for air reentry was through the shut off pump 44.

The latch mechanisms 60 provide for automatic opening and closing of the large frontal ports 62 when the latch mechanisms are unlatched and latched, respectively, and the speed of an operational cycle is greatly enhanced thereby. Excellent sealing action is achieved by the rectangular sealing elements 80 which move into a port closing relationship over the frontal ports 62 as the latch mechanisms are moved from the initial engaging position of FIG. 3 to the fully latched position of FIG. 4, wherein over-center toggle action keeps and locks the latch mechanisms 60 in the latched position until released by an upward and outward pull on the tabs 90.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. Apparatus for exposing a photosensitive material to light passed through an image forming workpiece to reproduce the image, comprising:

a transparent panel for supporting said material and workpiece while passing light to form said image; and a vacuum frame assembly movable between an open position and a closed position relative to said panel including a flexible vacuum blanket for pressing said material and workpiece together toward said panel;

said vacuum frame assembly including a rigid hollow frame member secured to said flexible vacuum blanket, means for drawing a vacuum in said hollow frame member, said frame member including a first port for evacuating air between said flexible vacuum blanket and said panel and a second port; and latch means movable between an unlatched position and a latched position for mechanically securing said frame assembly in said closed position and including closure means for closing said second port when said latch means is in said latched position and opening said second port in said unlatched position to permit outside air to enter said hollow frame member.

2. The apparatus of claim 1, wherein:

said first port is formed on an underside of said hollow frame member facing said panel when said frame assembly is in said closed position.

3. The apparatus of claim 1, including:

a resilient seal between said panel and said hollow frame member outside of said first port for providing an air-tight seal when said frame assembly is in said closed position.

4. The apparatus of claim 1, including:

a plurality of said hollow frame members joined together at opposite ends forming a hollow frame of rectangular shape forming a vacuum chamber extending around the periphery of and supporting said flexible vacuum blanket.

5. The apparatus of claim 4, including:

a resilient seal extending around said rectangular frame for sealing between said frame and said panel when said frame assembly is in said closed position.

6. The apparatus of claim 5, including:

a plurality of said first ports at spaced apart locations along an underside of said hollow frame members of said frame within said resilient seal for evacuation of air between said flexible blanket and said panel when a vacuum is drawn on said hollow frame by said vacuum drawing means.

7. The apparatus of claim 6, wherein:

said frame is mounted for pivotal movement along one of said frame members relative to said panel and said second port is formed in a frame member opposite said one frame member.

8. The apparatus of claim 7, wherein:

said vacuum drawing means is connected to said one frame member intermediate said opposite ends thereof.

9. The apparatus of claim 8, wherein:

said latch means includes a first latch element adjacent said second port and a second latch element adjacent said panel and engageable with said first latch element to close and retain said vacuum frame assembly in said closed position on said panel and close said second port with said closure means.

10. The apparatus of claim 9, wherein:

said second latch element comprises lever means supporting said closure means and adapted to engage said first latch element to draw said vacuum frame assembly toward said panel when latch means is moved toward said latched position.

11. A mechanical latch for securing a ported hollow vacuum frame in a closed position relative to a work supporting panel, said latch having closure means for closing off a port in said vacuum frame from the entry of outside air when said latch is moved to a latched position for holding said vacuum frame and said panel in said closed position and movable to open said port when said latch is moved to an unlatched position for permitting said vacuum frame and said panel to move apart.

12. The latch of claim 11, including:

first and second cooperating latch elements engageable to move said vacuum frame toward said panel into said closed position.

13. The latch of claim 11, including:

a first latch element mounted on said vacuum frame adjacent said port and a second latch element supporting said closure means in a port closing position for closing said port when said latch is moved toward said latched position.

14. The latch of claim 13, wherein:

said second latch element comprises a lever pivotally mounted for over-center toggle locking movement into said latched position for positively retaining said closure means in said port closing position when said latch is in said latched position.

15. The latch of claim 14, including:

a toggle link pivotally connected to said lever at one end and pivotally supported at an opposite end about a pivot axis spaced between said one end of said link and said first latch element.

16. In combination with a panel for supporting a workpiece and a flexible vacuum blanket for holding said workpiece against said panel when a vacuum is drawn in a space between said blanket and said panel;

a hollow vacuum frame having a plurality of ports, a first port in communication with said space for withdrawing air from said space when air is withdrawn from the interior of said hollow frame member and a second port in communication with an area outside said space for venting said interior of said hollow frame member; and latch means movable between an unlatched position and a latched position for mechanically holding said vacuum frame in a closed position relative to said panel, said latch means including closure means for sealing off said second port while said latch means is in said latched position and opening said second port to vent said hollow frame member when said latch means is in said unlatched position.

17. The combination of claim 16, wherein:

said frame is formed by a plurality of elongated hollow frame members interconnected at opposite ends to provide a rectangular shape; and including a plurality of said first ports at spaced apart positions along said frame members on an underside of said frame facing said panel in said closed position; and a resilient seal between said underside of said frame and said panel outside of and surrounding said first ports.

18. The combination of claim 17, wherein:

said second port is formed on a frontal surface of one of said frame members adjacent said latch means.

19. The combination of claim 18, wherein:

a vacuum is drawn on the hollow interior of said frame through a frame member opposite said one frame member having said second port therein.

20. The combination of claim 19, wherein:

said latch means include a first latch element adjacent said second port and a cooperating second latch element supporting said closure means for movement toward and away from said second port when said second latch element is moved between said latched and said unlatched position.

* * * * *